March 1, 1949.　　　　　C. JOHNSON　　　　　2,463,486
PUMP MECHANISM
Filed May 25, 1946　　　　　　　　　　　2 Sheets-Sheet 1
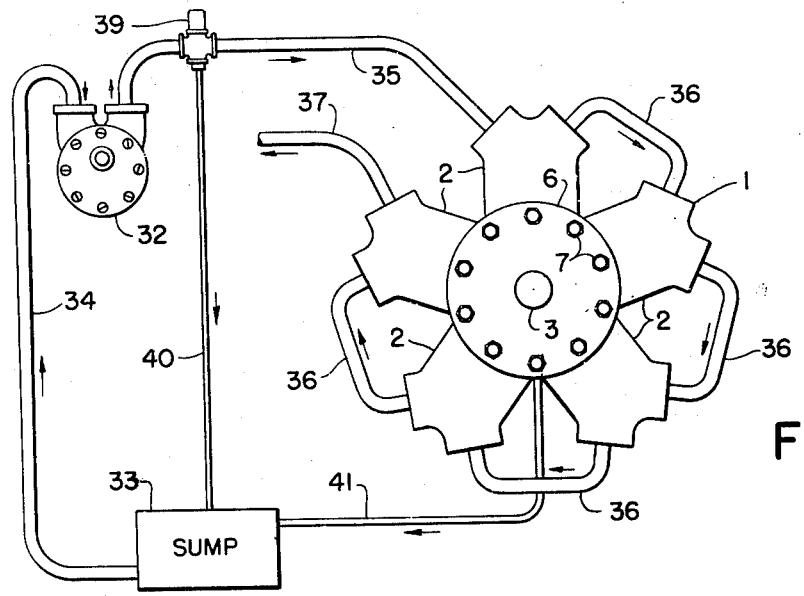
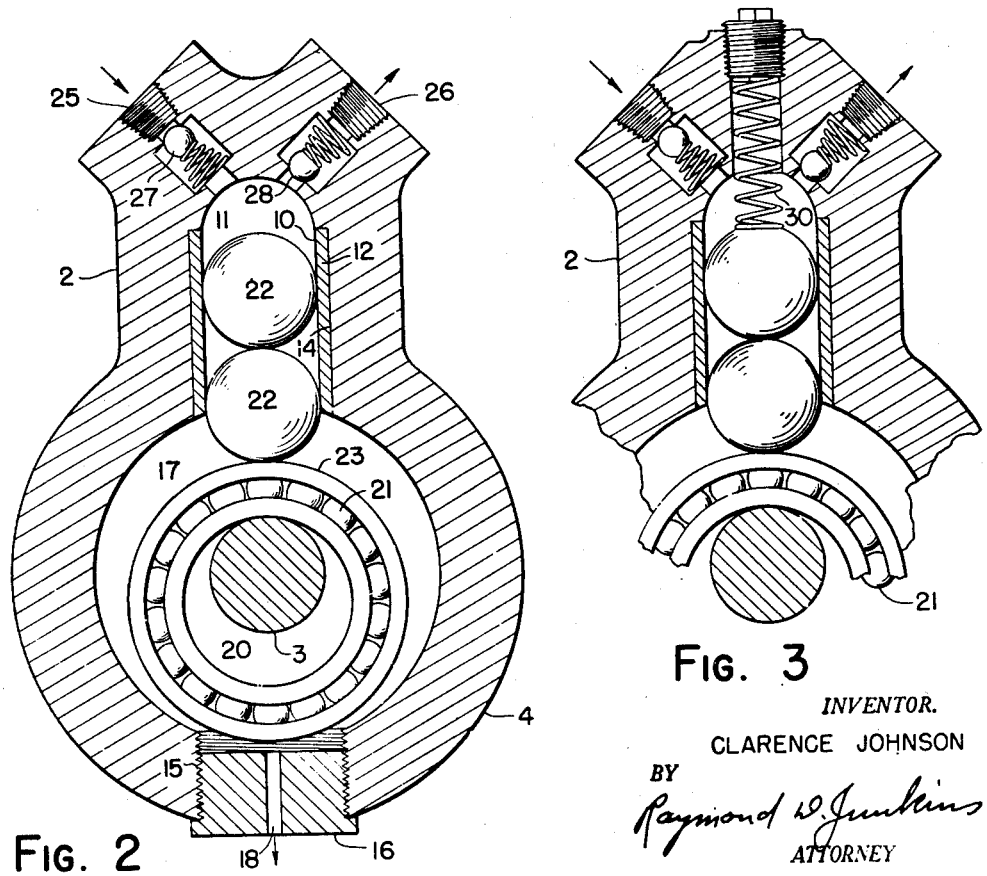
INVENTOR.
CLARENCE JOHNSON
BY
Raymond D. Junkins
ATTORNEY March 1, 1949.                    C. JOHNSON                    2,463,486
                                 PUM MECHANISM Filed May 25, 1946                                          2 Sheets-Sheet 2

INVENTOR.
CLARENCE JOHNSON
BY
Raymond D. Junkins
ATTORNEY

Patented Mar. 1, 1949

2,463,486

UNITED STATES PATENT OFFICE 2,463,486

PUMP MECHANISM

Clarence Johnson, South Euclid, Ohio, assignor to Bailey Meter Company, a corporation of Delaware Application May 25, 1946, Serial No. 672,203

10 Claims. (Cl. 103—174)

My invention relates to pump mechanisms, and more particularly to pump mechanisms of the reciprocating piston type.

In the usual pump, compressor or power unit of the reciprocating piston type, the piston is of a cylindrical shape and is caused to reciprocate within a cylindrical bore. The area of contact between the piston and the walls of the bore is comparatively large, and the resistance resulting from such contact is correspondingly large. A crankshaft is usually connected by a connecting rod to the piston for reciprocating the latter, and, since the connecting rod applies a force to the piston at an angle to its axis, the piston is forced unevenly against the walls of the bore, causing the friction at one side of the piston to be greater than at another. Even if the piston was reciprocated by a force acting along its axis, there would still be a variation in the contact and resistance at different points on the piston. The uneven distribution of friction between the piston and the cylinder walls tends to force the piston into a position with its axis at an angle to the axis of the bore, causing a wedging action which increases still further the friction between the moving parts.

It is very difficult to make a perfect piston, and, if the piston is not perfect, an uneven distribution of friction at its surface will result. Balls and cylinders, however, may be made to very close dimensions. A ball arranged within a cylinder will have only line contact with the latter, but with a ball made to fit closely to the cylinder walls, even the line contact will be sufficient to prevent excessive leakage from one side of the ball to the other. Pressure on the ball at diametrically opposite points produces a slight distortion of the ball and increases its sealing action with the walls of the cylinder. If the resistance to sliding movement of the ball within the cylinder becomes greater at one point than another, the ball merely rolls within the cylinder bore. It will be seen that no wedging action can take place, and the resistance to movement of the ball will always be evenly distributed. Since the ball can rotate into any position within the cylinder, all parts of its surface may be subjected at one time or another to wear. An eccentric ring may be employed for actuating the ball during its working stroke, and, if the ring engaging the ball is the outer race of a ball bearing, it will be seen that there will be no rubbing of the surfaces against each other to wear them away.

An object of my invention is to provide an improved pump mechanism. Another object is to provide a pump having an improved piston means reciprocable in a cylinder bore. Still another object is to provide an improved pump mechanism having one or more balls reciprocable in a cylinder bore, and eccentric means for moving said balls through their working strokes. Other objects of my invention will appear in the course of the following description.

In the accompanying drawings there are shown several forms which my invention may assume in practice.

In these drawings:

Fig. 1 is a diagrammatic view of my improved pump mechanism.

Fig. 2 is an enlarged sectional view of one of the pump cylinders and the crankcase, taken on a plane including the axis of the cylinder and perpendicular to the axis of the crankcase.

Fig. 3 is a view similar to Fig. 2 but showing a modification of my invention.

Figure 4:
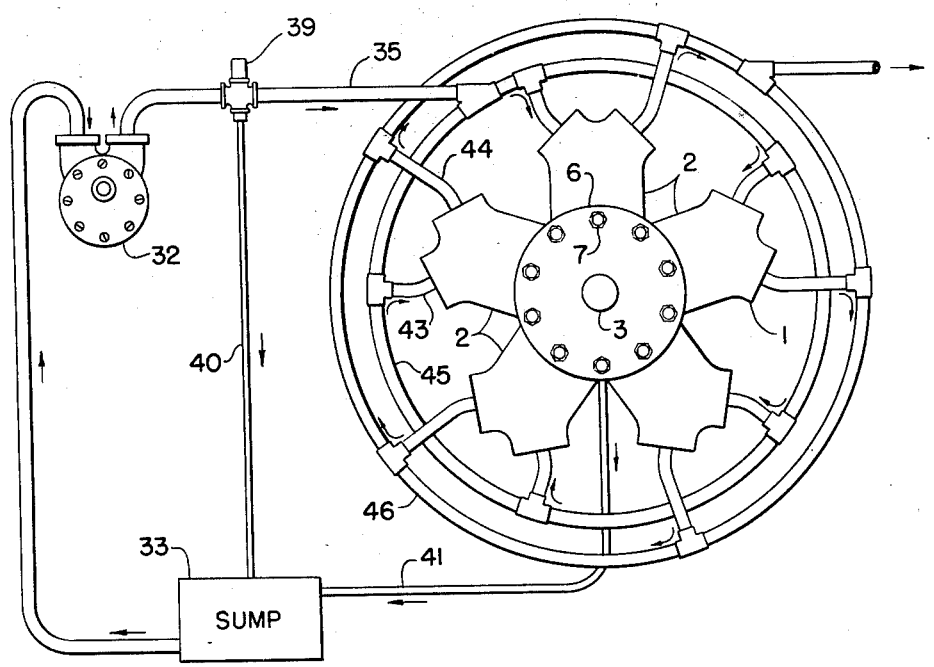
Fig. 4 is a diagrammatic view of another arrangement of my improved pump mechanism.
Figure 5:
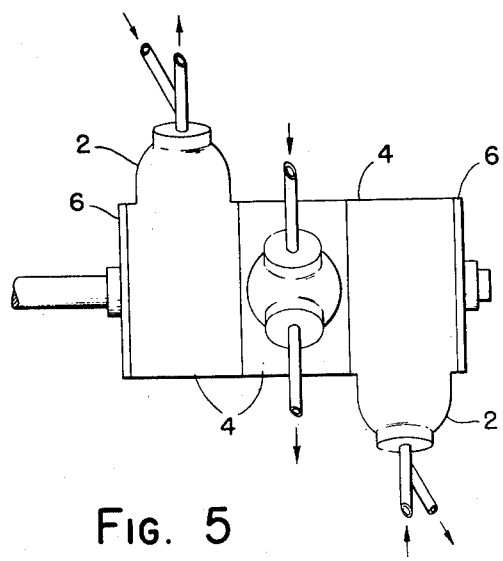
Fig. 5 is a side elevational view showing an arrangement of cylinders along the pump shaft in another form of my invention.

Referring to Figs. 1 and 4, it will be noted that my improved pump mechanism, generally designated 1, includes pump cylinders 2 extending radially from a shaft 3 which is adapted to be rotated by any suitable means, not shown. The pump cylinders may be provided, as shown in the form of the invention of Fig. 5, with integral housing portions 4 abutting each other and surrounding the shaft 3, or they may be provided, if desired, with a single housing which permits the cylinders to be arranged with their axes in a common plane. Figs. 1 and 4 show the pump mechanism having five cylinders, while Fig. 5 shows an arrangement with only three cylinders. It will be understood that the number of cylinders has no bearing on my invention. In each form of the invention, the ends of the pump housing are closed by plates 6 attached to the housing as by bolts or screws 7.

The cylinders 2, as shown in Fig. 2, are each provided with a bore 10 which opens at its outer end into a space 11 of hemispherical shape. The bore 10 may be formed directly in the cylinder or it may be formed, as in Fig. 2, by a sleeve shaped member 12, which permits ready manufacture at close tolerances. To permit the forming of the bore 10 or of a bore 14 in which the sleeve shaped member 12 is received, there is provided in the housing portions 4 an opening 15 which may be closed by a plug 16. To prevent the building up of a pressure in the interior 17 of the housing by pressure fluid leaking thereto from the cylinder bores, there is provided a vent passage 18 opening from the interior to the exterior of the housing.

Fixed to the shaft 3 at a point underlying the cylinder bore is an eccentric cam 20 having a ball bearing 21 arranged on its outer periphery. Received with a close fit in the cylinder bore 10 are balls 22, the inner ball bearing against the outer race 23 of the ball bearing 21, and the outer ball moving into the space 11 at the outer end of the bore 10 when the balls are moved into their outermost position by the eccentric cam. Instead of having two balls as shown there may be only one ball or, if desired, more than two balls. Communicating with the outer end of the cylinder bore are intake and discharge passages 25 and 26 respectively which conduct fluid relative to the bore under the control of inlet and discharge valves 27 and 28. The ball 22 may be held in engagement with the outer race of the bearing 21 by the force of gravity or by the pressure at which fluid is supplied to the cylinder bore through the intake passage. If the pump were used under conditions in which a subatmospheric pressure was necessary in the bore to cause fluid to enter it through the intake passage, or if the outer end of the bore was in such a low position that the balls would not be moved inwardly by the pressure of the fluid introduced through the intake passage, then some means such as the spring 30 in Fig. 3 may be needed for holding the balls in engagement with the bearing 21.

In the system shown in Fig. 1 a low pressure hydraulic pump 32 of any suitable type, pumps a liquid from a sump 33 through a conduit 34 to a conduit 35 leading to the intake passage of one of the pump cylinders 2. The pump cylinders 2 are connected in series by conduits 36, and the last cylinder of the series has its discharge passage connected in communication with a conduit 37 which conducts the liquid to some point of use. To prevent excessive pressures building up by too great a discharge from the pump 32, there is provided a relief valve 39 which operates at a predetermined pressure to connect the pump discharge to a conduit 40 leading to the sump 33. Any leakage from the cylinders to the pump housing is returned to the sump through the vent passage 18 and a conduit 41. If the pump cylinders 2 are arranged with their axes in a common plane, it will be seen that a single cam member 20 and bearing 21 will be sufficient to actuate the balls in each of the cylinders. With the cylinders arranged in different planes, as in Fig. 5, a separate cam member and bearing will be required for each cylinder.

Fig. 4 shows the intake and discharge of each cylinder connected by conduits 43 and 44 to intake and discharge conductor rings 45 and 46, respectively. The pump 32 supplies liquid from the sump 33 through the conduit 34 and the conduit 35 to the intake ring 45, and the pump cylinders 2 operate in parallel to pump the liquid from the ring 45 to the ring 46 which communicates with a discharge member 47.

As a result of my invention there is provided a pump mechanism in which the wearing of the parts is held to a minimum by preventing excessive localized friction between moving parts and by distributing the wear evenly to the surfaces of the parts.

While there are shown in this application several forms which my invention may assume in practice it will be understood that these forms are shown merely for purposes of illustration and that my invention may be modified and embodied in various other forms without departing from its spirit or the scope of the appended claims.

What I claim as new, and desire to secure by Letters Patent of the United States, is:

1. A pump mechanism comprising, in combination, a cylinder bore, means providing a hemispherical shaped space at one end of said bore, a ball having a close sliding fit in said bore and receivable in said hemispherical shaped space, means for effecting reciprocation of said ball in said bore and said hemispherical shaped space, intake and discharge passages opening into said hemispherical shaped space, and inlet and discharge valves for controlling the flow of fluid through said intake and discharge passages.

2. A pump mechanism comprising, in combination, a cylinder bore, means providing a hemispherical shaped space at one end of said bore, a ball having a close sliding fit in said bore and receivable in said hemispherical shaped space, means including an eccentric cam at the other end of said bore for reciprocating said ball in said bore and said hemispherical shaped space, intake and discharge passages opening into said hemispherical shaped space, and inlet and discharge valves for controlling the flow of fluid through said intake and discharge passages.

3. A pump mechanism comprising, in combination, a cylinder bore, means providing a hemispherical shaped space at one end of said bore, a ball having a close sliding fit in said bore and receivable in said hemispherical shaped space, means including an eccentric cam at the other end of said bore for moving said ball periodically through said bore into said hemispherical shaped space, means for yieldingly urging said ball toward said eccentric cam, intake and discharge passages opening into said hemispherical shaped space, and inlet and discharge valves for controlling the flow of fluid through said intake and discharge passages.

4. A pump mechanism comprising, in combination, a pump housing having a projecting portion formed integral therewith, a rotatable shaft extending through said housing, a bore formed in said projecting portion with its axis perpendicular to the axis of said shaft, the outer end of said bore opening into a hemispherical shaped space enclosed within said projecting portion, a ball having a close sliding fit within said bore, means including an eccentric cam fixed to said shaft for effecting a reciprocation of said ball in said bore, intake and discharge passages opening into said hemispherical shaped space, and inlet and discharge valves for controlling the flow of fluid through said intake and discharge passages.

5. A pump mechanism comprising, in combination, a pump housing having a projecting portion formed integral therewith, a rotatable shaft extending through said housing, a bore formed in said projecting portion with its axis perpendicular to the axis of said shaft, the outer end of said bore opening into a hemispherical shaped space enclosed within said projecting portion, a plurality of balls having a close sliding fit within said bore, an eccentric cam fixed to said shaft at a point underlying said bore, a ball bearing supported by said cam and engageable with the innermost one of said balls for effecting reciprocation of the latter in said bore, intake and discharge passages opening into said hemispherical shaped space, and inlet and discharge valves for controlling the flow of fluid through said intake and discharge passages.

6. A pump mechanism comprising, in combination, a pump housing having a projecting portion formed integral therewith, a rotatable shaft extending through said housing, a bore formed in said projecting portion with its axis perpendicular to the axis of said shaft, the outer end of said bore opening into a hemispherical shaped space enclosed within said projecting portion, a plurality of balls having a close sliding fit within said bore, means for reciprocating said balls in said bore including an eccentric cam fixed to said shaft and means for yieldingly urging said balls towards said cam, intake and discharge passages opening into said hemispherical shaped space, and inlet and discharge valves for controlling the flow of fluid through said intake and discharge passages.

7. A pump mechanism comprising, in combination, a pump housing, a plurality of cylinders extending radially from said housing, balls having close sliding fit in said cylinders, a rotatable shaft extending through said housing, means including an eccentric cam fixed to said shaft for moving said balls outwardly in said cylinders, inlet and discharge passages opening into the outer end of said cylinders, inlet and discharge valves for controlling the flow of fluid through said intake and discharge passages, passage means for connecting said cylinders in series, means for supplying fluid under pressure to the intake passage of the cylinder in one end of said series connected cylinders, and discharge passage means communicating with the discharge passage of the cylinder at the other end of said series connected cylinders.

8. A pump mechanism comprising, in combination, a pump housing, a plurality of cylinders extending radially from said housing and having cylinder bores, means providing a hemispherical shaped space at the outer end of each bore and of the same radial dimension as said bore, balls having a close sliding fit in said cylinders and receivable in said hemispherical shaped spaces, a rotatable shaft extending through said housing, means including an eccentric cam fixed to said shaft for moving said balls outwardly in said cylinders, inlet and discharge passages opening into said hemispherical shaped spaces, inlet and discharge valves controlling the flow of fluid through said intake and discharge passages, passage means for supplying fluid under pressure from a common source to the intake passages of said cylinders, and common passage means for conducting fluid from the discharge passages of said cylinders to a point of use.

9. A pump mechanism comprising, in combination, a cylinder bore, means providing a hemispherical shaped space at one end of said bore, a ball having a close sliding fit in said bore and receivable in said hemispherical shaped space, means for reciprocating said ball in said bore and said hemispherical shaped space, said last mentioned means including an eccentric cam acting to move said ball through said bore into said space, a spring acting upon said ball for urging the latter out of said space into said bore, a recess in the wall of said space for receiving said spring, intake and discharge passages opening into said space, and inlet and discharge valves for controlling said intake and discharge passages.

10. A pump mechanism comprising, in combination, a cylinder bore, means providing a hemispherical shaped space at one end of said bore, and having a radial dimension equal to that of said bore, a plurality of balls having a close sliding fit in said bore, a cam operative for moving said balls periodically in said bore toward said hemispherical shaped space, means for operating said cam, a member supported by ball bearings on said cam and engaging one of said balls for moving the latter in said bore, intake and discharge passages opening into said space, and inlet and discharge valves for controlling the flow of fluid through said intake and discharge passages.

CLARENCE JOHNSON.

REFERENCES CITED

The following references are of record in the file of this patent:

UNITED STATES PATENTS

| Number | Name | Date |
| --- | --- | --- |
| 831,890 | Plane | Sept. 25, 1906 |
| 1,325,434 | Carey et al. | Dec. 16, 1919 |
| 1,936,935 | Fitch et al. | Nov. 28, 1933 |